Aug. 4, 1964     I. B. WEISE     3,143,130
CONDENSATION TRAP
Filed Dec. 14, 1961
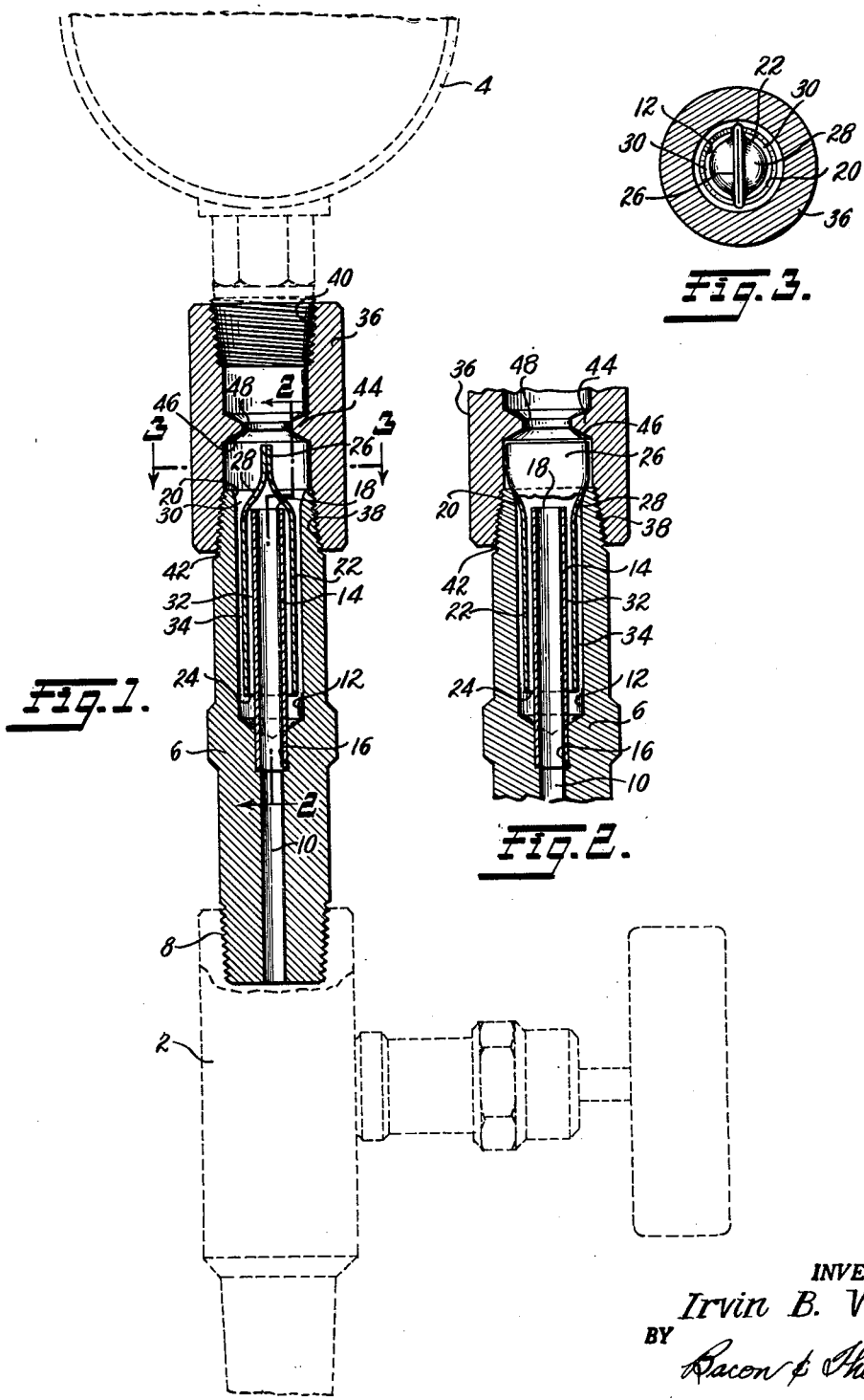
INVENTOR.
Irvin B. Weise
BY Bacon & Thomas
ATTORNEYS 3,143,130
CONDENSATION TRAP
Irvin B. Weise, Bellaire, Tex., assignor to Anderson, Greenwood & Company, Houston, Tex., a corporation of Texas
Filed Dec. 14, 1961, Ser. No. 159,220
3 Claims. (Cl. 137—247.11)

This invention relates to condensation traps and particularly to traps for use in a steam line leading to a pressure gauge.

Condensate traps for this purpose are conventionally formed of a length of copper or like tubing having a loop formed therein to serve as a trap for condensate and to isolate the gauge from the hot steam. Such traps, however, are good conductors of heat and must be made quite long so that heat will be radiated therefrom in sufficient quantity to protect the gauge.

The trap of the present invention on the other hand is quite short and, being formed of stainless steel, conducts heat very slowly so overheating of the gauge by conduction from the hot steam line is prevented. The steam trap is formed by a pair of telescopic tubes defining a sinuous path for the steam and an arrangement wherein condensation serves to block that path so as to prevent flow of superheated steam into the gauge mechanism. The stainless steel construction further provides exceptional strength, rendering the trap suitable for use in extremely high pressure installations.

It is, therefore, an object of this invention to provide a novel condensation trap that is efficient in operation, very compact and inexpensive to manufacture.

Another object of the invention is to provide a condensate trap of extremely simple construction and which is yet easily separable for cleaning or other service.

Additional objects and advantages will be apparent to those skilled in the art as the description proceeds, with reference to the accompanying drawings wherein;

FIG. 1 is a longitudinal sectional view through a condensate trap embodying the principles of the present invention.

FIG. 2 is fragmentary sectional view taken along the line 2—2 of FIG. 1, and

FIG. 3 is a transverse sectional view taken along the line 3—3 of FIG. 1.

The condensate trap of this invention is shown in full lines in the drawings, whereas in FIG. 1, by dotted lines, are illustrated a suitable valve 2 connected to a high pressure steam line (not shown) carrying superheated steam. The condensate trap is connected with the valve 2 and has a pressure gauge 4 connected to its upper end.

The condensate trap comprises a body or nipple portion 6 of generally tubular construction having external threads 8 at its lower end for connection to the valve 2. An inlet passage 10 of relatively small transverse dimension extends upwardly from the lower end of the nipple 6 and communicates with the bottom of a counterbore or chamber 12 which extends upwardly through the upper end of the nipple 6. An inlet tube 14 is press-fitted or otherwise secured in the upper end of passageway 10, as shown at 16, and constitutes a continuation of the passageway 10, of less diameter than the chamber 12, and extending upwardly to a point adjacent the upper end of the nipple 6 where it terminates in an open end 18.

The upper end of the side walls of the chamber 12 are flared outwardly slightly, as shown at 20. A second tube 22 extends downwardly in the space between tube 14 and the wall of chamber 12, spaced from both and concentric thereto. The tube 22 terminates at its lower end in an open end portion 24 spaced upwardly from the bottom of chamber 12. The upper end of tube 22 is radially flattened as shown at 26 and may be welded, brazed or otherwise sealed to form a closed upper end for the tube 22.

As will be seen from FIG. 2, flattening of the upper end of tube 22, as described, results in a widening of the flattened end to a width greater than the normal width of the tube 22. The flat portion 26 merges with the cylindrical portion 22 through a tapered portion 28. When viewed in the plane of FIG. 1, the tapered portion 28 converges upwardly whereas when viewed from the side shown in FIG. 2 the tapered portion 28 converges downwardly. The downwardly converging portions seen in FIG. 2 exist only on diametrically opposite sides of the tube 22 and are of substantially the same taper as the tapered upper portion 20 of the walls of chamber 12. Thus, the tapered portion 28 of tube 22 seats snugly and firmly against opposite sides of the chamber 12 and serves to hold the tube 22 in the desired axial position and to resist tilting movements thereof in the chamber 12. FIG. 3 clearly shows how the tapered portion 28 bears against the tapered seat 20 only at diametrically opposite points, leaving unobstructed arcuate openings 30 around the remainder of the periphery of the tube 22 and between it and the side walls of chamber 12. The parts are so proportioned that the closed end of tube 22 is held spaced vertically above the open end 18 of tube 14, thus leaving an open annular space between the end 18 and the tapered portion 28 to thus provide unobstructed communication between the interior of tube 14 and an annular passageway 32 between tubes 14 and 22. The open lower end 24 of tube 22 provides communication between the annular passageway 32 and a further annular passageway 34 between the tube 22 and the side wall of chamber 12. This passageway 34 termniates in the openings 30 previously described, thus providing an unobstructed but sinuous flow path from the inlet passageway 10 outwardly of the upper end of nipple 6.

A hollow cylindrical coupling 36 is provided with internal threads 38 at its lower end and 40 at its upper end. The threads 38 removably mate with exterior threads 42 on the upper end of nipple 6 and the internal threads 40 are provided for receiving a suitable pressure gauge 4.

The hollow interior of the cylindrical coupling 36 is provided with an annular internal rib 44 defining a downwardly facing shoulder 46 and a central opening 48. The opening 48 is of less diameter than the transverse dimension of the flattened portion 26 of tube 22, as seen in FIG. 2, and the parts are so proportioned that the shoulder 46 is closely adjacent the upper edge of the flattened portion 26 and thereby serves to hold the parts in assembled relationship and to prevent undue axial movement of tube 22 in an upward direction.

Obviously, however, the coupling 36 may be removed from nipple 6, thus permitting ready removal of the closed tube 22 to thus expose all parts and surfaces of the trap for cleaning or other necessary service.

In use, the trap may be connected in the manner shown in FIG. 1 and when it is desired to take a pressure reading, the valve 2 is opened to admit high pressure superheated steam to the passageway 10. In the sinuous flow path defined by tube 14, passageway 32 and 34 and tube 22, a substantial portion of the initial flow of steam will condense and collect in the bottom of chamber 12 to a depth above the lower open end 24 of tube 22. Thus, the condensate in the chamber 12 serves to prevent flow of any superheated live steam into the gauge 4. During this time the nipple 6 absorbs heat from the steam but is such a poor heat conductor that the heat is radiated into the atmosphere without being conducted through coupling 36 to the gauge 4.

Preferably at least nipple 6 and tubes 14 and 22 are formed of stainless steel, having poor heat conduction or other metal alloys having similar characteristics. The coupling 36 may also be made of such stainless steel or the like if desired but in many installations satisfactory operation can be achieved by forming the coupling of other materials.

In its assembled condition, the described trap may be said to comprise a body, 6 and 36, having a chamber therein with an inlet 10 and an outlet 48 communicating with the chamber.

While the condensate trap of the present invention is shown and described in an upright or vertical position, it will be obvious to those skilled in the art that it may be operated in other attitudes.

While a single specific embodiment of the invention has been shown and described herein, it is to be understood that the same is merely illustrative of the principles of the invention, which may be embodied in other forms falling within the scope of the appended claims.

I claim:

1. A condensate trap comprising; an elongated body member having a longitudinally extending chamber therein; inlet and outlet passageways extending, respectively, from opposite ends of said body member to respectively adjacent ends of said chamber; a first tube, substantially smaller in diameter than said chamber, fixed to said body at the inlet end of said chamber in communication with said inlet passageway to define a continuation thereof, said first tube extending centrally of said chamber toward said outlet passageway and having an open end spaced therefrom; a second tube, larger than said first tube but smaller in diameter than said chamber, extending longitudinally of said chamber in spaced concentric relation to said first tube and the sides of said chamber, said second tube having an open end and a closed end, said closed end comprising a radially flattened portion extending laterally of said second tube and engaging shoulder means in said chamber to limit movement of said second tube toward said inlet end and to hold said second tube in said concentric relation to said chamber and first tube, the length of said second tube being such that the closed end is spaced from the open end of said first tube and such that the open end of said second tube is spaced from the inlet end of said chamber.

2. A condensate trap as defined in claim 1 wherein said body member comprises a nipple portion and an outlet end portion removably mounted thereon; said chamber extending through an end of said nipple portion and said outlet passageway extending through said end of said nipple portion; said shoulder means being defined by the periphery of said chamber at said end of said nipple portion; said outlet passageway being smaller than said flattened end whereby to hold said second tube in said chamber.

3. A condensate trap comprising; an elongated body portion; an enlarged chamber extending inwardly from one end of said body portion; a relatively small inlet passage extending inwardly from the other end thereof and into the bottom of said chamber; an inlet tube having one end secured in the inner end of said passage, extending centrally along said chamber and having an open end adjacent the other end of said body portion; the sides of said chamber flaring outwardly at said other end of said body portion; a second tube extending into said chamber from said other end of said body portion, between said inlet tube and the wall of said chamber and in spaced concentric relation to both; said second tube having an open end and a radially flattened closed end; said flattened closed end having opposed tapered portions seated on said tapered sides of said chamber and holding said closed end in longitudinally spaced relation to the open end of said inlet tube the length of said second tube being such that the open end is spaced from the inlet end of said chamber; a cylindrical coupling removably threaded on the exterior of said body portion at said one end; an annular shoulder in said coupling defining an outlet opening of a diameter less than the width of said flattened end; said shoulder being closely adjacent said flattened end whereby to prevent substantial longitudinal displacement of said second tube.

References Cited in the file of this patent
UNITED STATES PATENTS

| | | |
|---|---|---|
| 204,449 | Prindle | June 4, 1878 |
| 211,317 | Blake | Jan. 14, 1879 |